(12) United States Patent
DeGroot

(10) Patent No.: US 7,681,717 B2
(45) Date of Patent: Mar. 23, 2010

(54) CONVEYOR BELT WITH ATTACHED STRIPS OF TEETH

(75) Inventor: Michael DeGroot, Grand Rapids, MI (US)

(73) Assignee: Thermodrive LLC, Grand Rapids, MI (US)

( * ) Notice: Subject to any disclaimer, the term of this patent is extended or adjusted under 35 U.S.C. 154(b) by 0 days.

(21) Appl. No.: 12/282,768

(22) PCT Filed: Mar. 14, 2007

(86) PCT No.: PCT/US2007/063952

§ 371 (c)(1),
(2), (4) Date: Sep. 12, 2008

(87) PCT Pub. No.: WO2007/106845

PCT Pub. Date: Sep. 20, 2007

(65) Prior Publication Data

US 2009/0032376 A1    Feb. 5, 2009

Related U.S. Application Data

(60) Provisional application No. 60/743,474, filed on Mar. 14, 2006.

(51) Int. Cl.
*B65G 23/02*    (2006.01)

(52) U.S. Cl. .......... 198/832; 198/835; 198/847
(58) Field of Classification Search ......... 198/824, 198/832, 835, 846, 847, 853; 74/89.2; 474/148, 474/149, 202, 204, 205
See application file for complete search history.

(56) References Cited

U.S. PATENT DOCUMENTS

| 3,083,583 | A | * | 4/1963 | Szonn | 474/205 |
| 4,127,040 | A | * | 11/1978 | Moore et al. | 474/250 |
| 4,634,409 | A | * | 1/1987 | Johnson et al. | 474/152 |
| 5,911,307 | A | | 6/1999 | Kraft et al. | |
| 6,561,344 | B1 | | 5/2003 | Basse | |
| 7,021,457 | B1 | * | 4/2006 | Schiltz | 198/835 |
| 7,210,573 | B2 | | 5/2007 | Mol | |
| 7,424,948 | B2 | * | 9/2008 | Mol | 198/832 |

* cited by examiner

*Primary Examiner*—James R Bidwell
(74) *Attorney, Agent, or Firm*—McGarry Bair PC

(57) ABSTRACT

An endless conveyor belt (10) comprises a flat belt portion (12) with strips (20) of teeth (28) attached to one side of the flat belt, near the side edges (26) of the flat belt. In another embodiment, the side edges of the strips are attached to the side edges of the flat belt. In either embodiment, the strips are first attached to the flat belt, and then machined to form a plurality of teeth on each strip. The strips can be of a different material than the flat belt. The conveyor belt can be employed with conveyors having small radius pulleys (54) and nose bars (58).

8 Claims, 4 Drawing Sheets

CONVEYOR BELT WITH ATTACHED STRIPS OF TEETH

CROSS-REFERENCE TO RELATED APPLICATION

This application claims priority on International Application No. PCT/US2007/063952, filed Mar. 14, 2007, which claims the benefit of U.S. Provisional Patent Application No. 60/743,474, filed Mar. 14, 2006, both of which are incorporated herein in their entirety.

BACKGROUND OF THE INVENTION

1. Field of the Invention

The invention relates to endless belts for conveyors and, more particularly, to an endless belt having separately attached strips that are machined to form teeth.

2. Description of the Related Art

Conveyors transfer loads between two locations by carrying loads on the upper span of an endless belt. The belt is typically installed between a drive pulley that transfers torque to the belt and one or more idler pulleys. In certain environments, such as the food industry, cleanliness is extremely important. Thus it is common to use conveyor belts having a smooth, continuous surface that is made of thermoplastic material that can be maintained in a sanitary condition. Also common to the food industry is the use of thin, flexible belts. Thin belts are used for scale conveyors, where conveyed products are weighed while on the conveyor belt, because they are lightweight. Belts for scale conveyors must be lightweight so that the belt adds minimal load to the scale and must be under minimal tension so that the belt does not support any of the weight of the product. Conveyors must further be able to meet at various angles to transfer loads between two conveyors, but must be placed close together to minimize the gap between the conveyors at the transfer point. Thin, flexible conveyors are used in these applications where pulleys and nose bars with small radii are used because they allow a smaller gap between conveyors.

One type of thin, flexible belt is a pin belt, where the belt comprises a continuous surface on one side and holes on the other side adapted to engage pins on a drive pulley, much like the manner in which a dot-matrix printer advances paper. Because the belt has holes rather than teeth to engage the drive pulley, the pin belt can be made relatively thin and flexible. However, traditional pin belts are not ideal, because as the belt stretches due to the weight of conveyed loads, the pins and holes are no longer aligned with respect to one another and torque cannot properly be transferred to the belt through the pins and holes. Furthermore, a pin belt must be used with a drive pulley having pins, and cannot be modified for use with a toothed drive pulley.

An example of a toothed thermoplastic belt that alleviates the problems associated with belt stretching is disclosed in WO 2006/078890, which is incorporated herein by reference in its entirety. The thermoplastic belt disclosed is a low tension, direct drive toothed belt having a smooth, continuous surface on one side and a teeth extending the width of the belt on the other side that are adapted to engages grooves or sheaves on a drive sprocket. To account for belt stretching, the teeth are adapted to engage the sprocket at a sprocket pitch greater than the belt pitch. The teeth are integrally formed with the belt by machining teeth shapes into a piece of belt material. Because the teeth are formed by machining a piece of belt material, the teeth must be of the same material as the rest of the belt. Material lost by machining also adds to the cost of the belt. Furthermore, the belt cannot be used for scale conveyors and conveyors having small radii pulleys and nose bars because it is relatively thick and heavy.

Another example of a toothed thermoplastic belt that alleviates the problems associated with belt stretching is disclosed in U.S. Pat. No. 5,911,307, which is incorporated herein by reference in its entirety. The conveyor belt disclosed includes a flat belt having timing belt extending from one side of the belt to engage a pulley. The timing belt has preformed timing teeth and is laminated to the flat belt such that it is evenly spaced from the side edges of the flat belt. The belt does not require pretensioning, which by definition means stretching the belt.

Although the conveyor belt described above does not have stretching problems associated with a pin belt, and the material and application restraints associated with the belt from the '493 patent application, it cannot be used for nose bars because the timing belt would prevent the belt from freely moving around the nose bar. Furthermore, the timing teeth are preformed on the timing belt, requiring that the timing belt be robust enough to withstand normal handling. In other words, the timing belt must be thick in the spaces between teeth.

SUMMARY OF THE INVENTION

The invention solves the aforementioned problems by providing a direct drive conveyor comprising an endless conveyor belt comprising a thin flat belt portion having opposing side edges, and two strips of teeth spaced from each other and adhered to the flat belt portion at the side edges. The belt is stretchable through its length and the teeth are formed after adhering the strips to the flat belt portion.

In one aspect, the strips have side edges and a side edge of each strip is flush with the side edges of the flat belt portion. In another aspect, the teeth are formed by machining. The strips can be formed of a different material than the belt flat portion.

As a result, the toothed conveyor belt can be made thin, lightweight, and flexible, allowing greater applications for use of the belt. In an application of the invention, the endless conveyor belt can be wrapped around at least one drive pulley at one end of a loop and a nose bar at another end of the loop.

DESCRIPTION OF THE PREFERRED EMBODIMENT

A conveyor belt according to the invention provides a belt that is sufficiently thin, lightweight and flexible to be used in applications usually performed by the prior art pin belts, while being able to be employed with a direct drive conveyor system.

Figure 1:
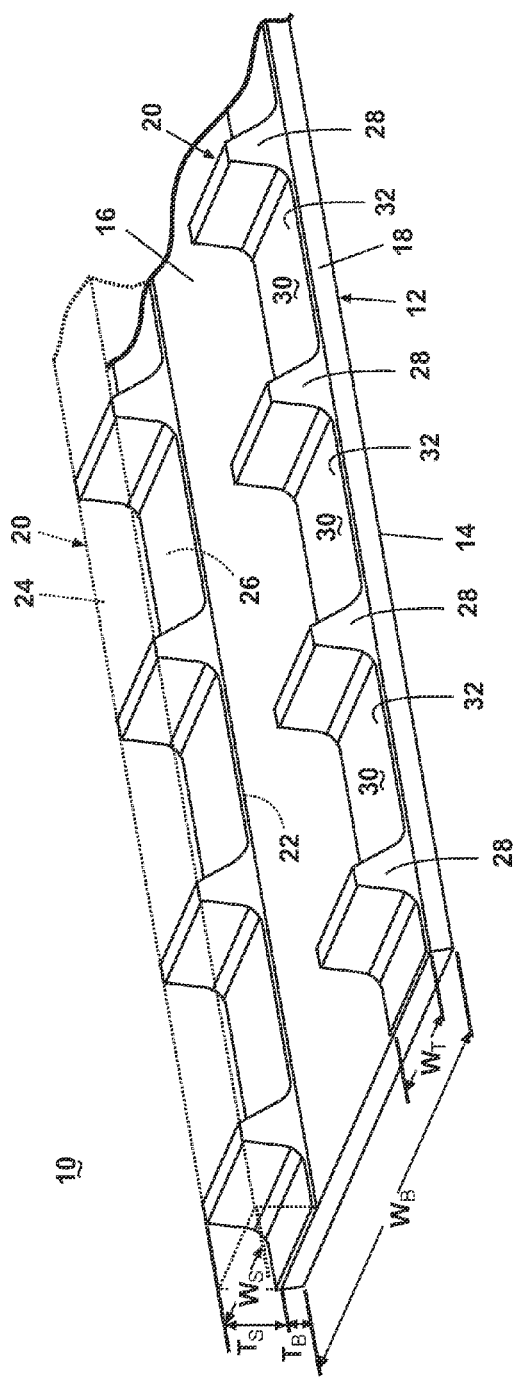
FIG. 1 is perspective view of a first embodiment of an endless belt according to the present invention.

Referring now to the drawings, FIG. 1 illustrates a first embodiment of an endless conveyor belt 10 according to the invention. The conveyor belt comprises a flat belt 12 having an outside load surface 14, an inside pulley surface 16, and two side edges 18. The outside surface 14 is fairly smooth and free of discontinuities. The flat belt 12 is preferably made of a thermoplastic material such as Pebax® resin, polyester, or polyurethane. The flat belt 12 has a lateral width $W_B$ defined between the side edges 18 and a thickness $T_B$ defined between the outside and inside surfaces 14, 16. An exemplary flat belt 12 has a width $W_B$ ranging from about 8" to 42" (20 cm to 110 cm) and thickness $T_B$ of about 0.0392" (1 mm).

Figure 2:
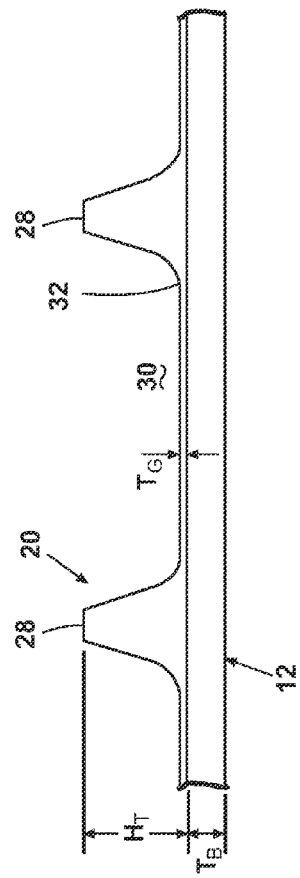
FIG. 2 is a side view of the belt from FIG. 1.

Referring additionally to FIG. 2, the conveyor belt 10 further comprises a pair of laterally spaced strips 20 attached to the inside surface 16 of the flat belt 12. As indicated by the phantom outline shown on one of the strips 20, the strips 20 are attached to the flat belt 12 before any machining of the strips 20. The strips 20 have a lower surface 22 and an upper surface 24, and two side edges 26. The strips 20 have a lateral width $W_S$ defined between the side edges 26 and a thickness $T_S$ defined between the upper and lower surfaces 22, 24. The thickness $T_S$ is preferably equal to or slightly larger than a desired tooth thickness for the teeth of the conveyor belt 10, to minimize the amount of material that must be removed when machining teeth into the strip 20. $T_S$ is generally greater than $T_B$, allowing strips 20 to be attached to a very thin belt. An exemplary strip has a width $W_S$ of about 1.5" (38 mm) and a thickness $T_S$ of about 0.16" (4 mm).

The strips 20 are preferably attached such that one side edge 26 of each strip 20 is generally flush with the side edges 18 of the flat belt 12, although it is within the scope of the invention for the strips 20 to be attached to the flat belt 12 such that the side edges 26 extends beyond the side edge 18 of the flat belt 12 or the side edge 18 extends beyond the side edges 26 of the strips 20.

According to another aspect of the invention, a method for manufacturing a toothed conveyor belt 10 is provided. The method includes attaching at least two strips 20 of tooth material to the flat belt 12 and machining the strips 20 to form teeth 28. The strips 20 can be attached to the flat belt 12 using any suitable attachment method. One suitable method is to adhere the strip 20 to the flat belt 12 using an adhesive such as glue. Glue is placed on part or all of the lower surface 22 of the strips 20 and/or the inside surface 16 of the flat belt 12 and two are brought into contact with each other to securely bond the strips 20 and flat belt 12. Other suitable lamination methods can also be used. Another suitable attachment method is welding the strips 20 to the flat belt 12 to join the two materials thereof. A welding technique such as laser welding can be used if a transparent or semi-transparent material, for example, a clear polyurethane, is used for the strip 20.

After attachment to the flat belt 12, the strips 20 can be machined to form a plurality of teeth 28, as is illustrated on one of the strips 20 of FIG. 1. The strips 20 can be machined using a conventional grinder or miller to remove material from between the teeth. The teeth 28 can be machined to have any suitable shape and dimension. As illustrated, the teeth 28 are generally trapezoidal in shape. Other exemplary shapes are rectangular, square, triangular, and cylindrical. The teeth 28 have a lateral width $W_T$ and a height $H_T$, regardless of shape. The lateral width $W_T$ is preferably generally equal to or slightly less than the width $W_S$ of the strip and the height $H_T$, is preferably generally equal to or slightly less than the strip thickness $T_S$, so that a minimal amount of material needs to be removed by machining. An exemplary width $W_T$ and height $H_T$ for the teeth are about 38 mm and 4 mm, respectively for a strip 20 having a width $W_S$ of about 38 mm and a thickness $T_S$ of about 4 mm. The space or gap 30 between adjacent teeth 28 are equal to provide equidistant teeth 28 on the strip 30. During machining, material is removed from the gap 30 such that a band 32 of strip material is left in the gap 30. Since the strip 20 is machined after being attached to the flat belt 12, the band 32 can be made extremely thin. In other words, the band 32 has a thickness $T_G$ that is much smaller than the height of the teeth $H_T$. An exemplary band thickness $T_G$ is 0.25 mm for the teeth dimensions given in the above example. Because the strips 20 are separately attached, the flat belt 12 and teeth 28 can be made of dissimilar materials. The teeth 28 can be made of a harder material, for example polyurethane, than the flat belt 12.

Figure 3:
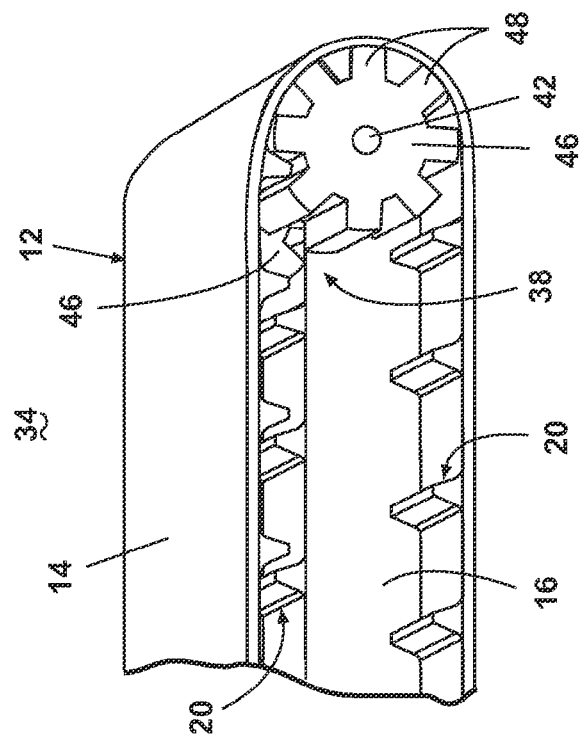
FIG. 3 is a perspective view of the endless belt from FIG. 1 installed between two sets of pulleys.
Figure 3:
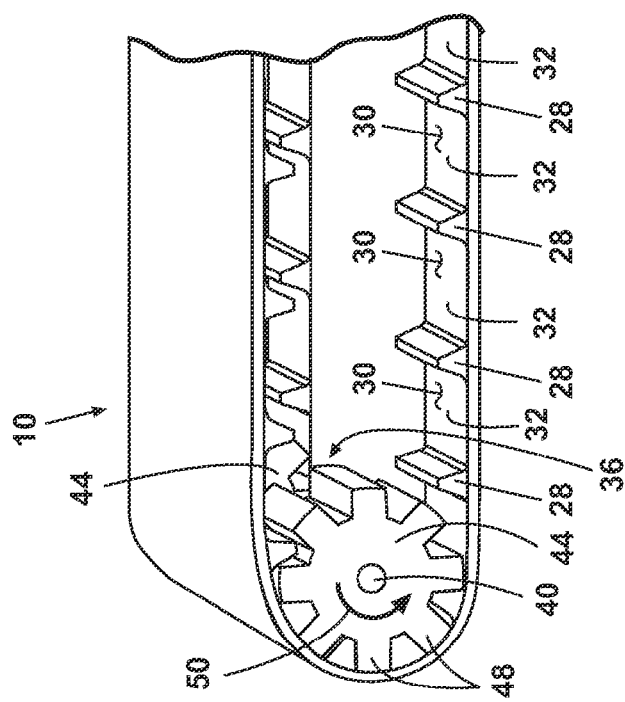
Figure 4:
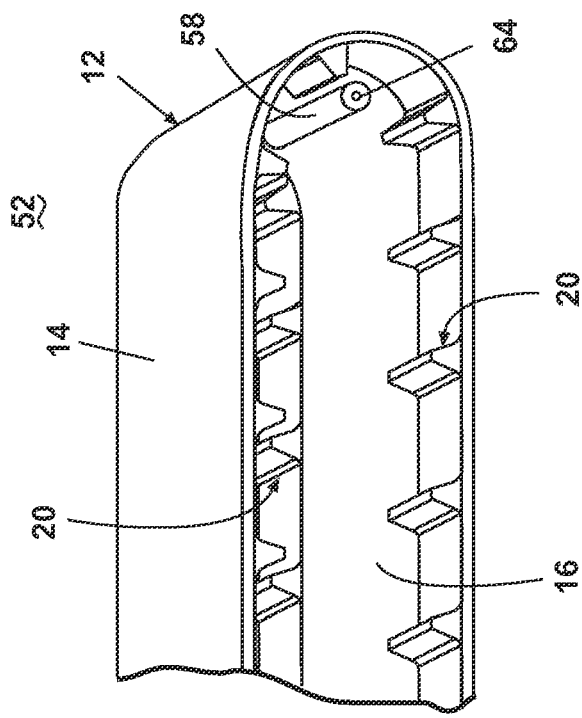
FIG. 4 is a perspective view of the endless belt installed between a set of pulleys and a nose bar.
Figure 4:
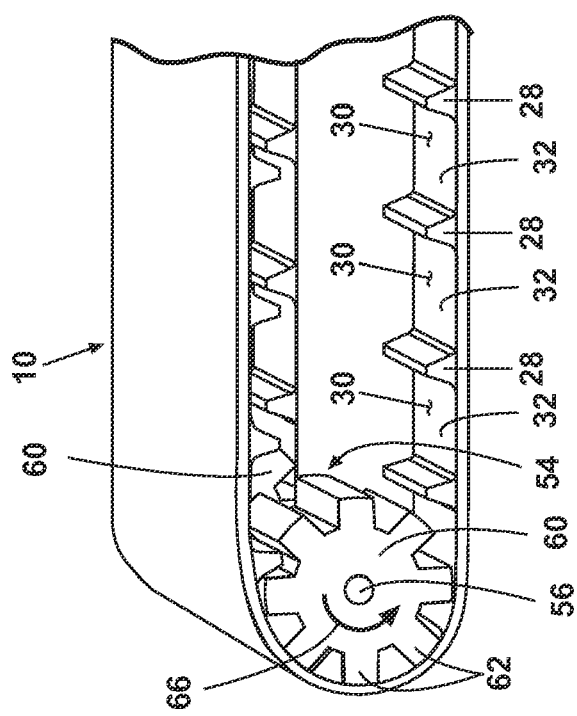

Two different conveyors employing the endless conveyor belt 10 are illustrated in FIGS. 3-4. These conveyors are given as possible examples of how the conveyor belt 10 can be installed and driven, and should not be construed to limit the invention to the illustrated arrangements; the conveyor belt 10 can be used in conjunction with any other conveyor not specifically contemplated herein. Referring to FIG. 3, a first conveyor 34 comprises the conveyor belt 10 in a typical installation between two sets of pulleys 36, 38, where each of the sets of pulleys 36, 38 is mounted for rotation on a respective shaft 40, 42. At least one of the pulley sets, for example, set 36, comprises a pair of substantially identical, spaced drive pulleys 44. The other pulley set 38 comprises a pair of substantially identical, spaced idler pulleys 46. Each pulley 44, 46 has a plurality of radially extending sheaves 48 spaced around its circumference. The sheaves 48 engage the teeth 28 on the conveyor belt 10. In this configuration, the conveyor belt 10 will carry loads on the upper outside surface 14 of the flat belt 12 as the conveyor belt 10 travels in the direction indicated by arrow 50.

Referring to FIG. 4, a second conveyor 52 comprises the conveyor belt 10 installed between a set of pulleys 54 mounted for rotation on a shaft 56 and a nose bar 58. The pulley set 54 comprises a pair of substantially identical, spaced drive pulleys 60. Each pulley 60 has a plurality of radially extending sheaves 62 spaced around its circumference. The sheaves 62 engage the teeth 28 on the conveyor belt 10. The nose bar 58 is mounted for rotation on a shaft 64 and is positioned between strips 20 so that the nose bar 58 can freely rotate without obstruction from the teeth 28. The nose bar 58 has a small radius which makes the conveyor 52 especially suited for transferring loads to another conveyor since the small radius of the nose bar 58 allows a smaller gap between two conveyors. In this configuration, the conveyor belt 10 will carry loads on the upper outside surface 14 of the flat belt 12 as the conveyor belt 10 travels in the direction indicated by arrow 66.

Figure 5:
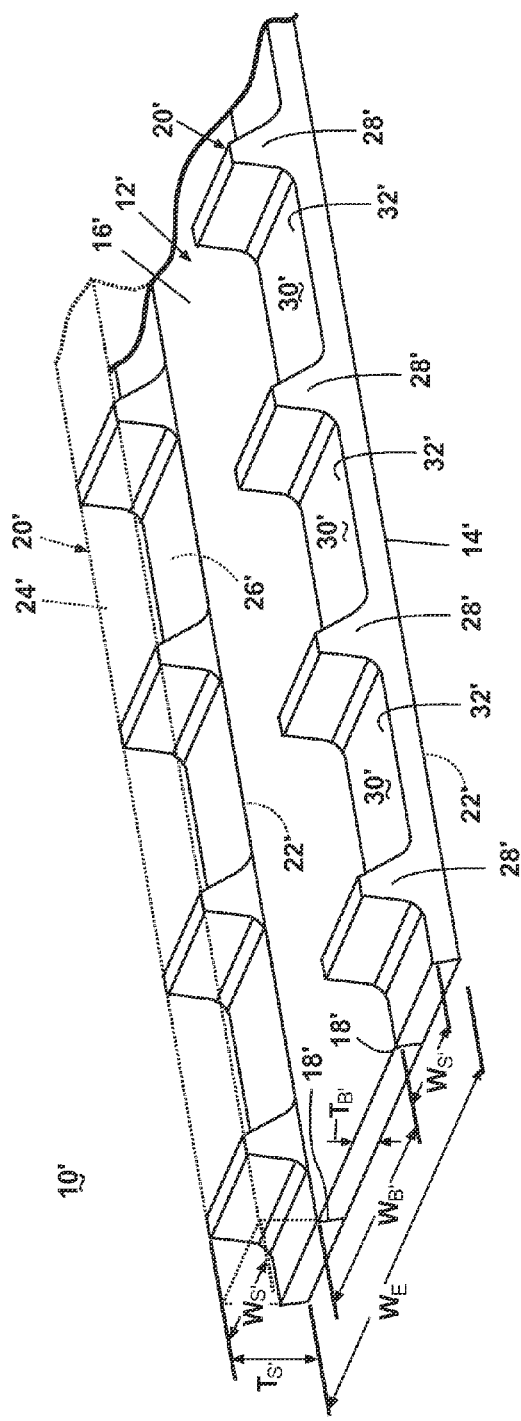
FIG. 5 is a perspective view of a second embodiment of an endless belt according to the present invention.
Figure 6:
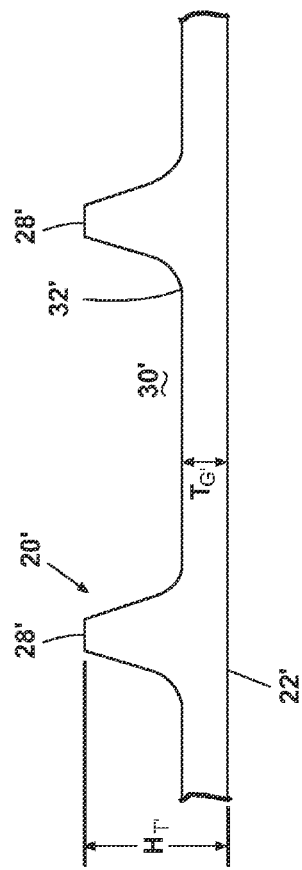
FIG. 6 is a side view of the belt from FIG. 5.

Referring to FIGS. 5-6, a second embodiment of an endless conveyor belt 10' according to the invention is illustrated, where like elements are identified by like numbers bearing prime (') symbol. In this embodiment, inner lateral edges 26' of the strips 20' are attached to the lateral edges 18' of the flat belt 12', using any suitable attachment method as discussed above. Thus, it is preferable that the gaps 30' are machined to have a band 32' with a thickness $T_G$' substantially equal to the flat belt thickness $T_B$'. An effective belt width $W_E$ is defined as the sum of the belt width $W_B$' and the strip widths $W_S$', and is equivalent to the amount of space available to carry loads when the conveyor belt 10' is used with a conveyor. The conveyor belt 10' has all the advantages discussed above for the first embodiment and it further allows a flat belt 12' with a smaller width $W_B$' to be used, thus conserving belt material.

The above-described conveyor belt provides a toothed conveyor belt that is thin, lightweight, and flexible. The conveyor belt is useful in applications were such properties are essential, such as with small diameter pulleys, nose bars, and scale conveyors. Furthermore, the conveyor belt can be employed in a low tension, direct drive toothed belt conveyor as disclosed in WO 2006/078890 to provide a similar conveyor with a conveyor belt that is thinner, more lightweight, and more flexible that the belt illustrated therein. Thus, this aspect of the invention will be a thin endless belt, stretchable through its length, with two separated strips of teeth adhered to the belt at its edges. A position limiter can be provided as described in WO 2006/078890 to keep the teeth engaged on the drive sheave of a pulley until the exit point. Yet the belt is thin enough to wrap around a small diameter nose bar at the other end, intermediate the two teeth strips. By manufacturing a belt using the above-described method, material can be conserved, while still providing a conveyor belt having sufficient integrity for conveyor operations.

Although the above description has been made with reference to a direct drive, thermoplastic belt, the invention is equally applicable to other types of conveyor belts. Generally stated, while the invention has been specifically described in connection with certain specific embodiments thereof, it is to be understood that this is by way of illustration and not of limitation, and the scope of the appended claims should be construed as broadly as the prior art will permit.

What is claimed is:

1. An endless conveyor belt comprising a thin flat belt portion having opposing side edges, and two strips of teeth spaced from each other and adhered to the flat belt portion at the side edges, wherein the belt is stretchable through its length and the teeth are formed after adhering the strips to the flat belt portion.

2. The endless conveyor belt of claim 1 wherein the strips have side edges and a side edge of each strip is flush with the side edges of the flat belt portion.

3. The endless conveyor belt of claim 2 wherein the teeth are formed by machining.

4. The endless conveyor belt of claim 3 wherein the strips are formed of a different material than the belt flat portion.

5. The endless conveyor belt of claim 4 wrapped around at least one drive pulley at one end of a loop and a nose bar at another end of the loop.

6. The endless conveyor belt of claim 1 wherein the teeth are formed by machining.

7. The endless conveyor belt of claim 1 wherein the strips are formed of a different material than the belt flat portion.

8. The endless conveyor belt of claim 1 wrapped around at least one drive pulley at one end of a loop and a nose bar at another end of the loop.

* * * * *